United States Patent [19]
Wiesen

[11] Patent Number: 5,517,953
[45] Date of Patent: May 21, 1996

[54] STEPPED PISTON AXIAL ENGINE

[76] Inventor: Bernard Wiesen, 15 Beach Rd., Great Neck, N.Y. 11023

[21] Appl. No.: 334,552

[22] Filed: Nov. 7, 1994

Related U.S. Application Data

[62] Division of Ser. No. 107,253, Aug. 16, 1993, Pat. No. 5,362,154.

[51] Int. Cl.$^6$ ................................................. F02B 75/26
[52] U.S. Cl. ........................ 123/51 R; 123/557; 123/562
[58] Field of Search ................... 123/65 S, 56.3, 123/56.4, 51 R, 55.5, 55.7, 56.1, 56.2, 56.9

[56] References Cited

U.S. PATENT DOCUMENTS

| | | | |
|---|---|---|---|
| 1,987,699 | 1/1935 | Moore | 123/56.9 |
| 2,099,983 | 11/1937 | Lake | 123/56.1 |
| 2,188,630 | 1/1940 | Grahman | 123/56.1 |
| 2,384,309 | 9/1945 | Jordan | 123/65 S |
| 3,078,832 | 2/1963 | Braine | 123/56.1 |
| 4,068,629 | 1/1978 | Hooper | 123/65 S |
| 4,090,478 | 5/1978 | Trimble et al. | 123/51 R |
| 5,031,581 | 7/1991 | Powell | 123/56.9 |
| 5,375,567 | 12/1994 | Lowi | 123/56.9 |

*Primary Examiner*—David A. Okonsky

[57] ABSTRACT

A highly pressurized internal combustion engine, wherein arrangements to balance the intake flow of air that passes from the turbochargers to a windchest, through spring valves to compressor cylinders, that force the charge into a pressure chamber to supply an equally divided amount of charge air to the power cylinder ports that are controlled by the movements of the power pistons, with provisions to cool the air charge within the engine block coolant jacket. The bottom of the compressor pistons are employed to pump oil mist into and out of the bottom of the compressor cylinders to cool and lubricate the power pistons. A simple oil cooler surrounds the engine shaft where it passes through the cylinder block coolant jacket.

3 Claims, 5 Drawing Sheets

STEPPED PISTON AXIAL ENGINE

This is a Division of Ser. No. 08/107,253 Filed Aug. 16, 1993 and now U.S. Pat. No. 5,362,154.

BACKGROUND

1. Field of Invention

This invention relates to engines of the axial type, under which designation are included all engines having pistons reciprocating in cylinders which are arranged parallel to the power shaft.

2. Description of Prior Art

Engines of this general type are not new, and many patents have been issued upon such engines, but engines of this character thus far conceived have generally not proved successful and have been found to have shortcomings which have rendered them unsuitable for practical and commercial usage.

The present invention was conceived to overcome the deficiencies of prior devices and provides an improved and novel construction which may be combined with the devices disclosed in applicant's U.S. Pat. No. 5,083,532 titled "Mechanism for Variable Compression Ratio Axial Engines" and U.S. Pat. No. 5,362,154 titled "Pivoting Slipper Pad Bearing and Crosshead Mechanism."

OBJECTS AND ADVANTAGES

Accordingly several objects and advantages of the present invention are:

(a) to provide a practical, efficient and simple method for introducing a highly pressurized charge into the engine cylinders. These means being so arranged that the passages to the cylinders will be relatively short and direct, with provision for cooling the charge within the engine frame;

(b) to provide an arrangement for a stepped-piston, whereby the piston skirt can be efficiently cooled and lubricated without the problem of overoiling the cylinders, thereby eliminating the high oil consumption that has been associated with pistons of this type;

(c) to provide a simple oil cooler that is an integral part of the engine frame;

(d) the more general object of this invention is to provide a high-output axial engine, combining features that contribute greatly to its overall performance, that combine to form a compact, lightweight and economical to manufacture structure.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE INVENTION

The drawings show an engine in a simplified depiction without placing stress on relatively obvious refinements of portions thereof.

Figure 1:
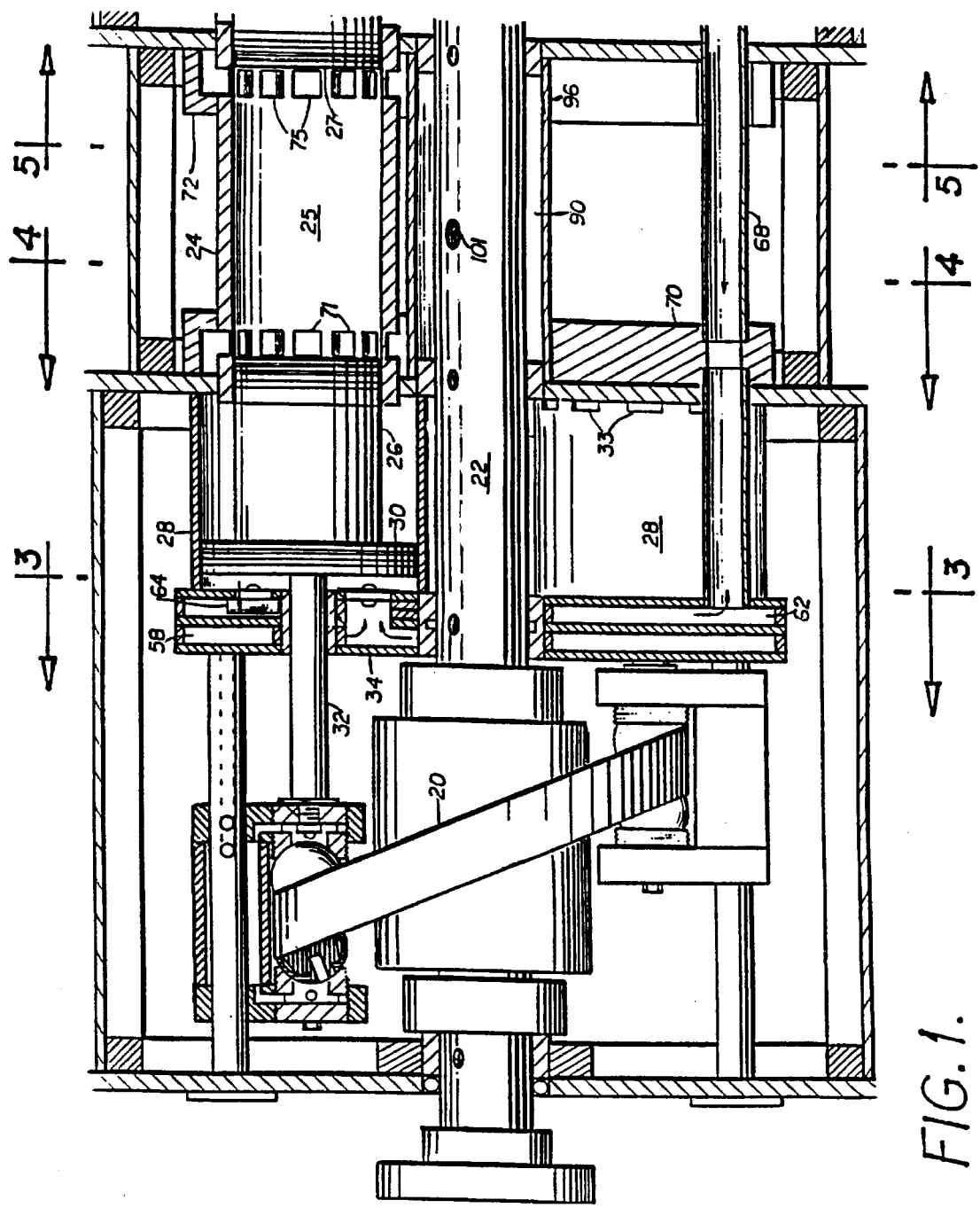
FIG. 1 is a view in section of a multi-cylinder axial engine taken on line 1—1 in FIG. 2 constructed in accordance with the present invention.
Figure 2:
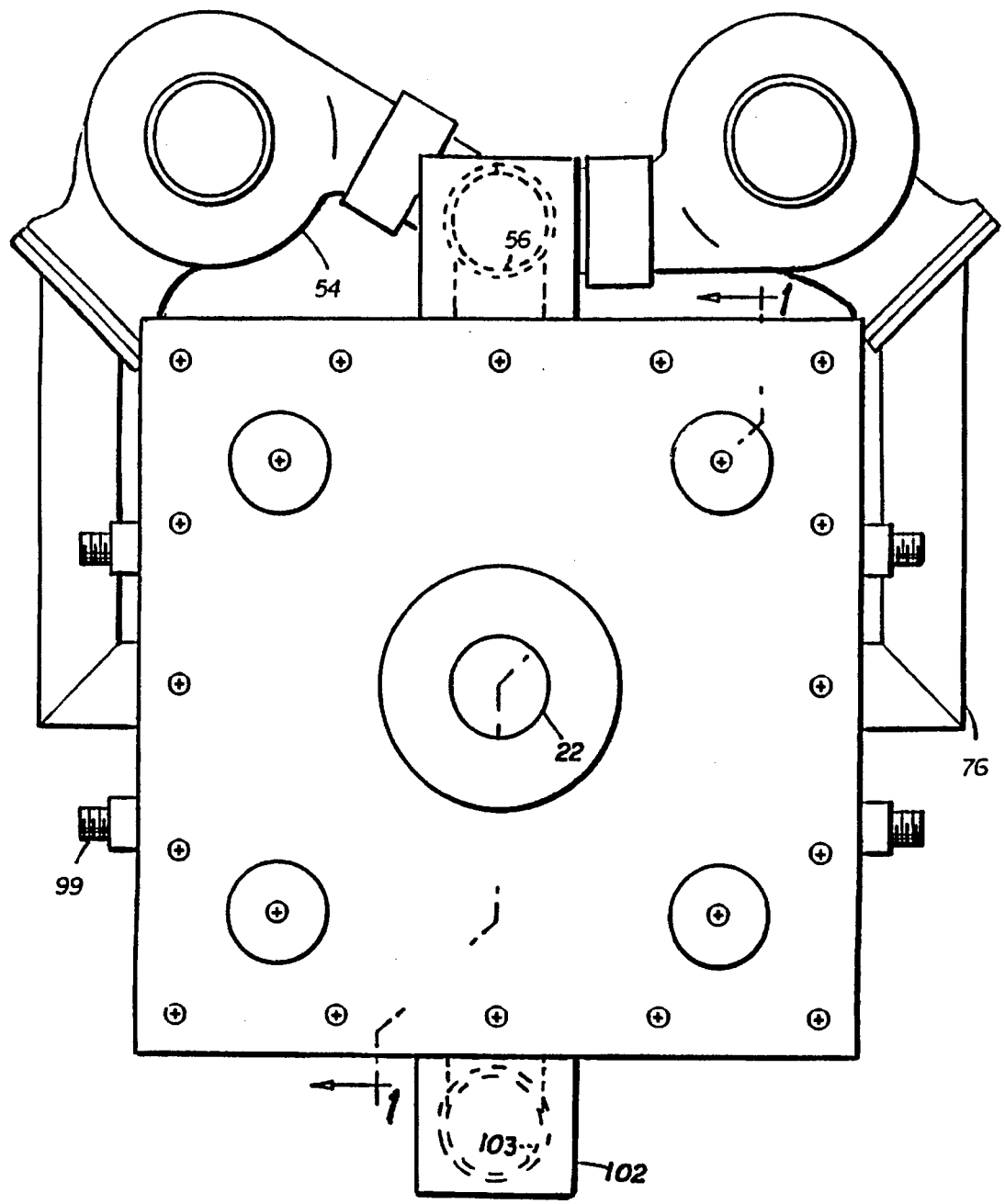
FIG. 2 is a front plan view of the invention constructed in accordance with the present invention.
Figure 3:
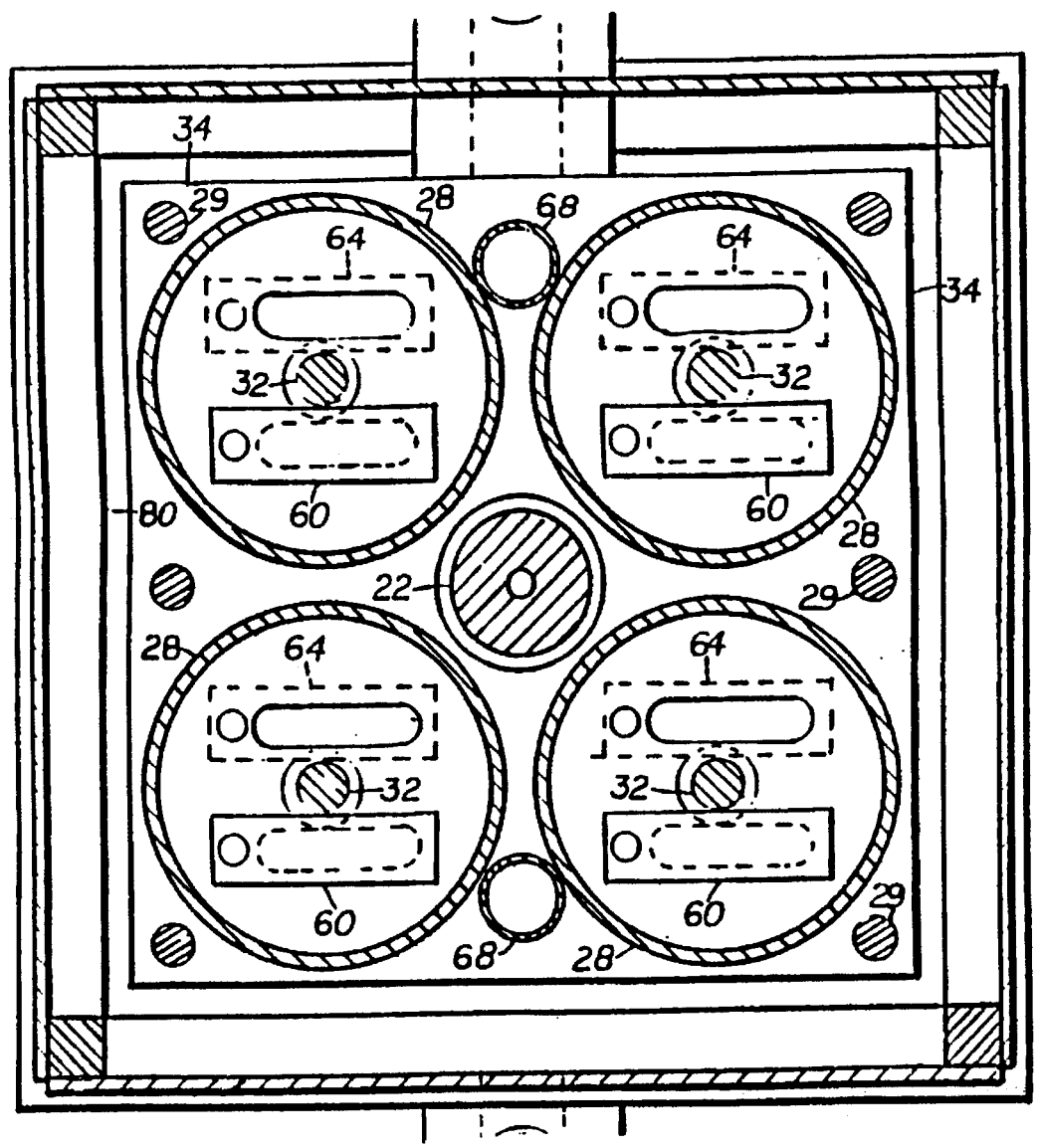
FIG. 3 is a view in section taken on line 3—3 of FIG. 1.
Figure 4:
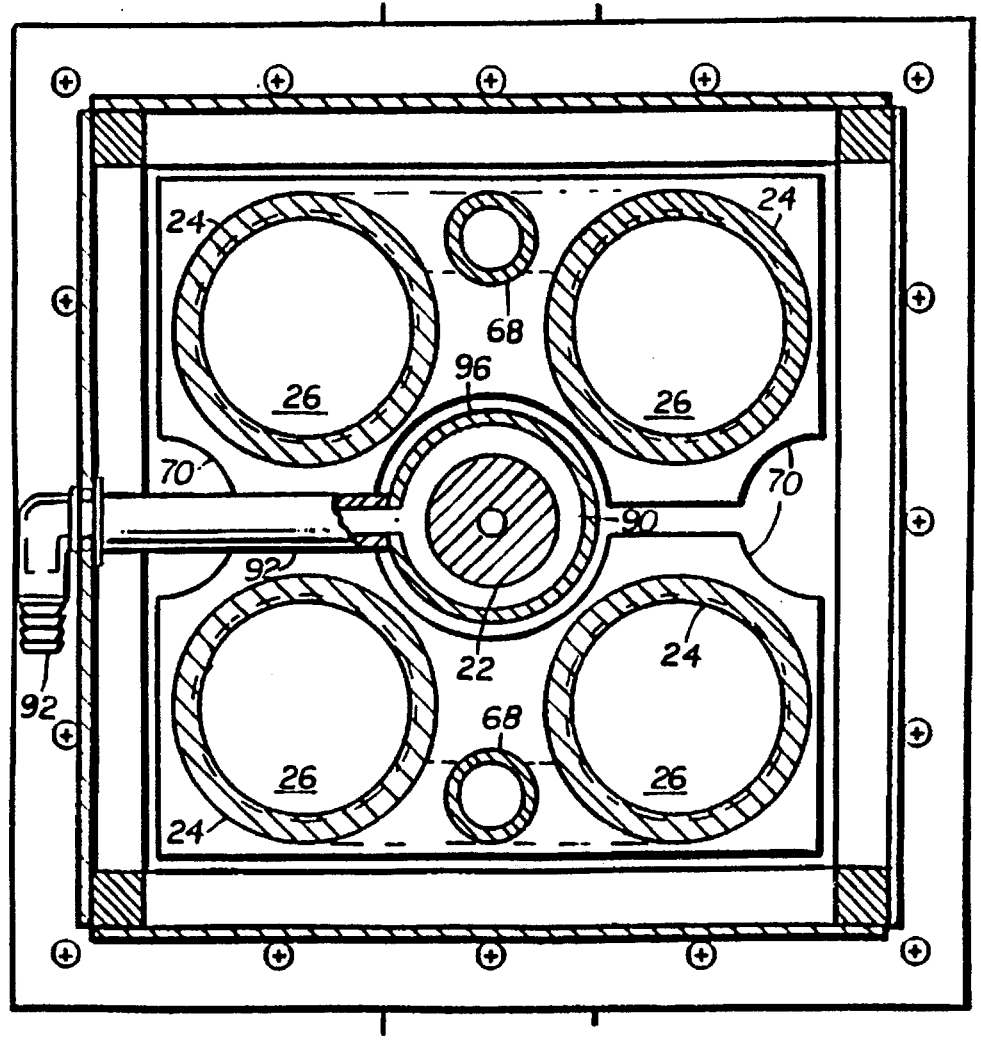
FIG. 4 is a view in section taken on line 4—4 of FIG. 1
Figure 5:
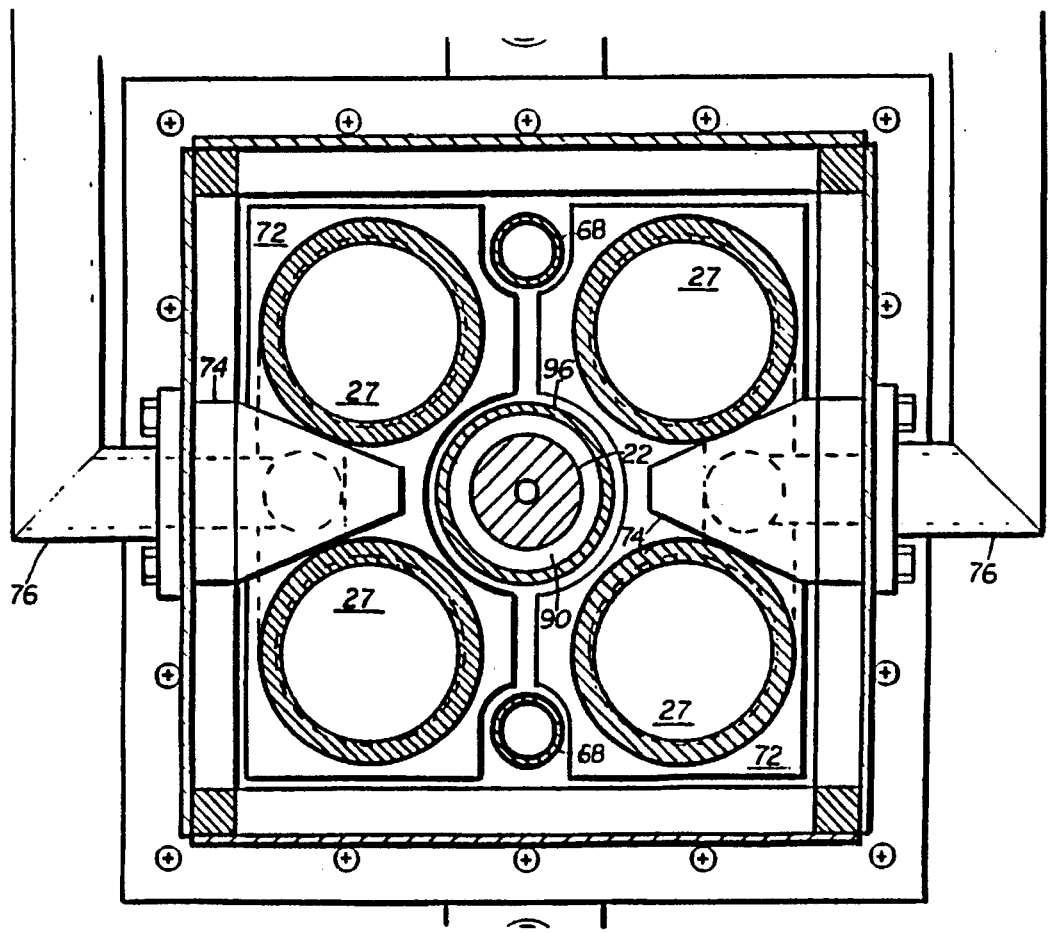
FIG. 5 is a view in section taken on line 5—5 of FIG. 1.

Referring to FIGS. 1–5 inclusive, a swashplate 20 may be operably connected to a shaft 22 as disclosed in applicant's U.S. Pat. No. 5,083,532 titled "Mechanism for Variable Compression Ratio Axial Engines." Power cylinders 24, are arranged parallel to shaft 22 with a pair of opposing power pistons 26 and 27 occupying each end of power cylinder 24 with a combustion chamber 25 located between power pistons 26 and 27. Arranged adjacent opposite ends of each power piston 26 and 27 are compressor pistons 30 operating in compressor cylinders 28, compressor cylinder ports 33 permit the flow of oil mist into compressor cylinder 28 allowing for the lubrication and cooling of power pistons 26 and 27 and preventing the overoiling of the power cylinder 24. Compressor head 34 seals ends of compressor cylinders 28 with studs with a piston rod 32 passing through compressor head 34. Piston rod 32 may be joined to the crosshead mechanism disclosed in applicant's U.S. Pat. No. 5,362,154 titled "Pivoting Slipper Pad Bearing and Crosshead Mechanism." A pump (not shown) pumps oil through oil fitting 92 to oil reservoir 90 which encircles shaft 22 between formers 82 in coolant jacket 96, cooled oil then travels through opening 101 in shaft 22 for distribution throughout the engine. As oil travels through the engine under pressure it passes through the various bearings and into oil collector elbows 102 to an oil collector tube 103.

Air is forced through turbochargers 54 to intake tube 56 into a windchest 58, past one-way spring valves 60 into compressor cylinders 28. As compressor piston 30 compresses the charge in compressor cylinder 28, charge is forced through a spring valve 64 into pressure chamber 62 and on through a transfer tube 68 into intake manifold 70, through intake ports 71. Charge is compressed between power pistons 26 and 27 and at the proper time fuel is injected by injector 99 causing a large pressure increase due to the ensuing combustion of fuel that forces power pistons 26 and 27 apart, opening exhaust ports 75 permitting exhaust gasses to enter exhaust manifold 72, into exhaust elbow 74 and through exhaust pipe 76 into turbocharger 54, thus completing the engine cycle.

Although one specific embodiment of the invention has been particularly shown and described, it should be understood that the invention is capable of modification and that changes in the construction and in the arrangement of the various cooperating parts may be made without departing from the spirit or scope of the invention.

Thus the scope of the invention should be determined by the appended claims and their legal equivalents, rather than by the examples given.

The embodiments of the invention for which an exclusive property or privilege is claimed are defined as follows:

I claim:

1. An axial engine comprising a plurality of power cylinders arranged parallel to a power shaft, a plurality of compressor cylinders adjacent opposite ends of said power cylinders, with each of said power cylinders containing two power pistons reciprocating in opposition to each other in said power cylinders with a combustion chamber between said power pistons, with means to change the reciprocating motions of said power pistons to rotary motion, a plurality of compressor pistons reciprocating in said compressor cylinders with means to control the flow of air to said compressor cylinders and said power cylinders in combination with valves and ports to control and balance the pressure in a wind chest and a pressure chamber, with means to cool a charge with an engine coolant jacket, with piston controlled ports to control the flow and timing of the charge.

2. An engine comprising at least one power cylinder and at least one power piston reciprocating in said power cylinder, with an equal number of compressor pistons and compressor cylinders arranged adjacent opposite ends of said power cylinders, with said pistons operably connected to means to change reciprocating motion to rotary motion, with such means enclosed within an engine case, with means to permit the flow of oil mist from said engine case of said engine, through ports formed in said compressor cylinders, to cool and lubricate said power pistons as said power piston partially reciprocates out of said power cylinder into said compressor cylinder.

3. An axial engine comprising a plurality of cylinders having axes parallel to and surrounding a power shaft, with a tubular member defining an oil reservoir formed around said shaft where said shaft passes through a coolant jacket of said engine, with means to pump oil through said tubular member into openings through said shaft to permit said tubular member to function as an oil cooler.

* * * * *